US012730964B2

(12) United States Patent
Gao et al.

(10) Patent No.: US 12,730,964 B2
(45) Date of Patent: Sep. 8, 2026

(54) GENERATIVE AI SYSTEMS FOR INTERPRETING CUSTOMER SERVICE COMMUNICATIONS

(71) Applicant: THE BOSTON CONSULTING GROUP, INC., Boston, MA (US)

(72) Inventors: Andrea Gao, Boston, MA (US); Urvi Awasthi, Boston, MA (US); Sanjay Elangovan, Boston, MA (US); Matthew Kropp, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 174 days.

(21) Appl. No.: 18/435,603

(22) Filed: Feb. 7, 2024

(65) Prior Publication Data

US 2025/0252254 A1 Aug. 7, 2025

(51) Int. Cl.
*G06F 40/20* (2020.01)
*H04M 3/51* (2006.01)

(52) U.S. Cl.
CPC .......... *G06F 40/20* (2020.01); *H04M 3/5175* (2013.01); *H04M 2203/2066* (2013.01); *H04M 2203/25* (2013.01)

(58) Field of Classification Search
None
See application file for complete search history.

(56) References Cited

U.S. PATENT DOCUMENTS 12,374,324 B2 * 7/2025 Shirodkar ............. G06F 40/216
2021/0158234 A1 5/2021 Sivasubramania et al.
2021/0201238 A1 * 7/2021 Sekar ....................... G06N 3/09
2022/0210268 A1 6/2022 Cole et al.
2022/0391591 A1 * 12/2022 Ronen .................. G06F 16/345
2023/0112369 A1 4/2023 Chopra et al.
2023/0244855 A1 8/2023 Attwater et al.
2023/0360640 A1 11/2023 Asi et al.
2023/0394226 A1 12/2023 Medalion et al.
2025/0220114 A1 * 7/2025 Lourie ................... G10L 15/18

FOREIGN PATENT DOCUMENTS

CN 117015780 A 11/2023

OTHER PUBLICATIONS

International Search Report and Written Opinion in International Appln. No. PCT/US2025/013943, mailed on May 8, 2025, 12 pages.
Vaswani et al., "Attention Is All You Need," CoRR, Submitted on Aug. 2023, arXiv:1706.03762, 15 pages.

* cited by examiner

*Primary Examiner* — Nafiz E Hoque
(74) *Attorney, Agent, or Firm* — Fish & Richardson P.C.

(57) ABSTRACT

In an example method, a system accesses first data including text transcripts of a plurality of voice calls, and generates, based on the first data, labeled representations of the voice calls using the one or more computerized LLMs. The system generates the labeled representations by determining a plurality of contextual categories associated with the voice calls, segmenting the text transcript into a plurality of transcript segments, and associating each of the transcript segments with a respective one of the contextual categories. Further, the system generates second data representing the labeled representations of the voice calls and stores the second data using the one or more hardware storage devices.

23 Claims, 14 Drawing Sheets

620

GENERATIVE AI SYSTEMS FOR INTERPRETING CUSTOMER SERVICE COMMUNICATIONS

TECHNICAL FIELD

This description generally relates to systems and methods for interpreting customer service communications (e.g., telephone calls, voice calls, etc.) using generative artificial intelligence (AI).

BACKGROUND

In general, a company may offer various products and/or services for sale to its customers. Further, a company may employ one or more agents to communicate with its customers in support of the business. For example, an agent can assist a customer with selecting, purchasing, and/or using a particular product or service offered by the company.

SUMMARY

In general, a computerized generative artificial intelligence (AI) system can be used to automatically interpret communications between a company's agent (e.g., a customer service representative) and a customer, and to generate data representing those communications.

As an example, an agent and a customer may conduct a call (e.g., a telephone call, voice call, video call, etc.) in which the agent assists the customer in selecting, purchasing, using, and/or troubleshooting a particular product or service offered by the company. A system can retrieve a text transcript of the call and generate a detailed summary of the call using a generative AI system.

For instance, the system can segment the text transcript into several text segments, and using the generative AI system, label each of the text segments based on its context (e.g., by assigning one or more contextual categories to that text segment). In some implementations, the context of a particular text segment can refer to the topic that is being discussed and/or the phase of the conversation during a particular time interval (e.g., based on the customer's "journey" during the call). For instance, a label can indicate that a text segment corresponds to an initial greeting phase, a customer identification phase, an issue identification phase, an issue resolution phase, a close of conversation phase, or some other phase of a conversation.

In some implementations, based on the customer journey phase-labeled transcript, the system can track the path of the conversation and the amount of time that was spent on each topic and/or phase of the conversation in order to generate a summary of the customer's "journey" during the call. Further, the system can determine similar information for several such calls (e.g., between several respective agents and customers) in order to determine aggregated information regarding the communications between the agents and the customers. Further still, the system can generate and display a graphical user interface to a user, such that the user can intuitively understand the nature of the calls, either individually or in aggregate.

The implementations described herein can provide various technical benefits. As an example, the implementations described herein allow a computer system to automatically interpret a call, without requiring manual feedback from a human. Further, these operations can be performed using a generative AI system, which performs computer-specific operations on input data in an objective manner (and in a manner that is not feasible for a human to perform), rather than relying on a subjective human interpretation of the input data which may be less suitable for performance by a computer.

As another example, the implementations described herein include an improved graphical user interface that provides a user with information regarding several calls, either individually or in aggregate, in a manner that is particularly intuitive for the user to understand. Accordingly, the operation of the computer system is improved (e.g., by increasing the ease by which a user can interact with the computer system)

As another example, the implementations described herein can be used to optimize communications between agents and customers, thereby reducing the resources that are consumed in conducting those communications. For example, based on the information generated by the computer system, a determination can be made that calls can be made more efficient (e.g., shorter) by reducing the amount of time that the agent and the customer spend in confirming the customer's identity. Based on this determination, a company can develop an improved technique for confirming the customer's identity (e.g., a technique that takes less time to perform), and deploy that technique to its agents. Accordingly, the length of each call can be reduced without negatively impacting the customer experience, thereby reducing the consumption of network resources (e.g., telephone capacity, network bandwidth, computer processor utilization, computer memory, etc.) and/or the use of human labor to service the calls.

In an aspect, a method for segmenting and labeling text transcriptions using one or more computerized large language models (LLMs) includes: accessing, by a computer system from one or more hardware storage devices, first data including text transcripts of a plurality of voice calls; generating, by the computer system based on the first data, labeled representations of the voice calls using the one or more computerized LLMs, where the one or more computerized LLMs include a generative transformer model having at least one of an encoder or a decoder, where generating the labeled representations of the voice calls includes: determining, using the one or more computerized LLMs, a plurality of contextual categories associated with the voice calls; segmenting, using the one or more computerized LLMs, the text transcript into a plurality of transcript segments; and associating, using the one or more computerized LLMs, each of the transcript segments with a respective one of the contextual categories; generating, by the computer system, second data representing the labeled representations of the voice calls, and storing, by the computer system, the second data using the one or more hardware storage devices.

Implementations of this aspect can include one or more of the following features.

In some implementations, the second data can include one or more data structures representing an association between each of the transcript segments and the respective one of the contextual categories.

In some implementations, the method can further include generating, by the computer system, a graphical user interface, where the graphical user interface includes at least a portion of the second data; and causing, by the computer system, the graphical user interface to be presented to a user.

In some implementations, the graphical user interface can include: a first graphical element including at least a portion of the text transcripts; and one or more graphical labels overlaid on the first graphical element, where each of the graphical labels represents a respective one of the contextual categories.

In some implementations, the method can further include determining, for each of the contextual categories, an aggregate call time of the voice calls associated with that contextual category.

In some implementations, the method can further include generating, by the computer system, a graphical user interface representing the aggregate call times of each of the contextual categories, and causing, by the computer system, the graphical user interface to be presented to a user.

In some implementations, the method can further include receiving one or more audio recordings of the voice calls, and generating, using a computerized speech recognition system, at least some of the text transcriptions based on the one or more audio recordings.

In some implementations, the contextual categories can include at least one of: a greeting category, a caller identification category, or a conversation close category.

In some implementations, the contextual categories can include one or more categories associated with providing customer service by a first user to a second user.

In some implementations, determining the contextual categories can include causing the one or more computerized LLMs to generate summaries of each of the text transcripts, and causing the one or more computerized LLMs to determine a plurality of candidate contextual categories based on the summaries.

In some implementations, determining the contextual categories can include clustering the candidate contextual categories into a plurality of clusters, and selecting the contextual categories based on the clusters.

In some implementations, the contextual categories can be determined using a machine learning process.

In some implementations, each of the transcript segments can be associated with a respective one of the contextual categories using a machine learning process.

In some implementations, at least one of the encoder or the decoder can be configured to apply a computerized attention mechanism over its respective inputs while generating the labeled representations of the voice calls.

In some implementations, the voice calls can be conducted between one or more customers of an organization and one or more representations of the organization.

In some implementations, the method can further include generating graphs representing a customer journey associated with each of the voice calls, and including at least some of the graphs in the second data.

In some implementations, generating the graphs can include, for each of the voice calls: determining, based on the second data, a plurality of states of the voice call; determining, based on the first data, an order of the plurality of states; and generating a data structure representing the plurality of state of the voice call and an order of the plurality of states; and generating the graphs based on the data structure.

In some implementations, the method can further include, for each of the voice calls: determining a call type of the voice call; and generating the labeled representation of the voice call based on the determined call type.

In some implementations, the contextual categories can be determined based on the call type.

In some implementations, the one or more hardware storage devices can be implemented on the computer system.

In some implementations, the one or more hardware storage devices can be implemented on one or more additional computer systems remote from the computer system.

Other embodiments of this aspect include corresponding computer systems, apparatus, and computer programs recorded on one or more computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by a data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
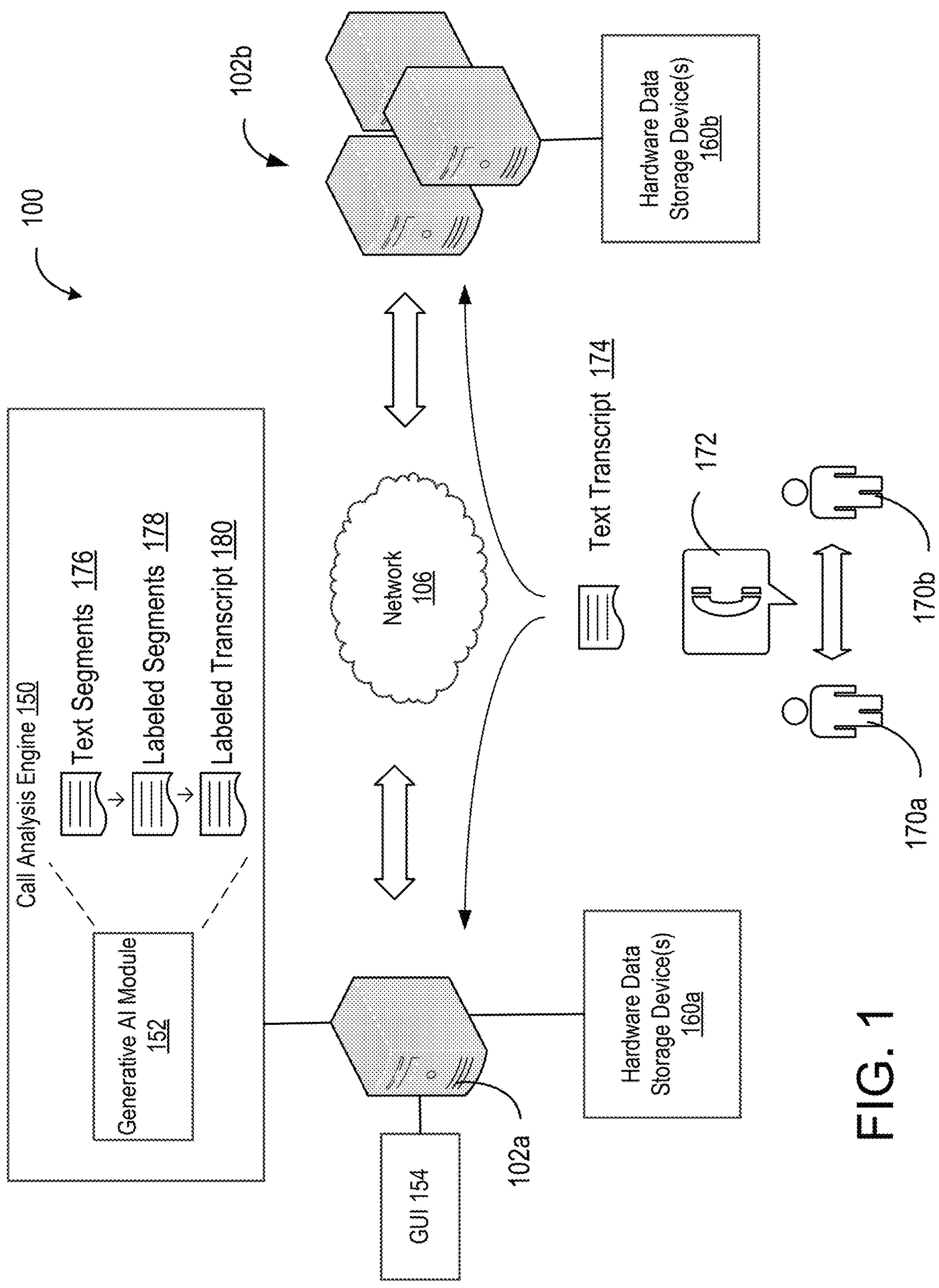
FIG. 1 shows an example system, including a call analysis engine, for automatically interpreting communications between one user or more users and generating data representing those communications.

FIG. 1 shows an example system 100 for automatically interpreting communications between one or more users and generating data representing those communications. In some implementations, the system 100 can be configured to perform the operations with respect to voice communications between an agent 170*a* for a company (e.g., a customer service representative) and a customer 170*b*.

As an example, the agent 170*a* and the customer 170*b* conducts a call 172 (e.g., a telephone call, voice call, video call, etc.) in which the agent 170*a* assists the customer 170*b* in selecting, purchasing, using, and/or troubleshooting a particular product or service offered by a company. The system 100 generates or otherwise obtains a text transcript 174 of the call 172. In some implementations, the system 100 can generate an audio recording of the call 172 and generate the text transcript 174 based on the audio recording (e.g., using audio transcription software and/or circuitry). In some implementations, the system 100 can retrieve the text transcript 174 from another system (e.g., a system that recorded and/or generated a transcript of the call).

Further, the system 100 generates a detailed summary of the call 172 based on the text transcript 174. For example, the system 100 includes a call analysis engine 150 implemented on a computer system 102*a*. The call analysis engine 150 receives the text transcript 174 and interprets the text transcript 174 using a generative AI module 152. In some implementations, the call analysis engine 150 can generate a summary of the call 172 (e.g., a summary of the topics discussed during the call 172). In some implementations, the call analysis engine 150 can determine the course of the conversation (e.g., by identifying one or more phases of the conversation, the sequential order of those phases, the time spent during each phase, etc.) in order to summarize the customer's "journey" during the call 172.

As an example, the call analysis engine 150 can segment the text transcript 174 into several text segments 176, where each text segment 176 includes a different respective portion of the text transcript 174. Further, the call analysis engine 150 can provide at least some of the text segments 176 to the generative AI module 152 and instruct the generative AI module 152 to generate one or more customer journey labels for each of the text segments based on its context (e.g., by assigning one or more contextual categories to that text segment 176).

In some implementations, the context of a particular text segment 176 can refer to the topic that is being discussed and/or the phase of the conversation during a particular time interval. As an example, a customer journey phase label can indicate that a text segment 176 corresponds to an initial greeting phase (e.g., a phase in which the agent 170*a* and the 170*b* greet one another). As another example, a customer journey phase label can indicate that a text segment 176 corresponds to a customer identification phase (e.g., a phase in which the agent 170*a* confirms the identity of the customer 170*b*, such as by obtaining the user's given name, username, account number, password, etc.). As another example, a customer journey phase label can indicate that a text segment 176 corresponds to an issue identification phase (e.g., a phase in which the agent 170*a* determines an issue that the customer 170*b* wishes to have resolved). As another example, a customer journey phase label can indicate that a text segment 176 corresponds to an issue resolution phase (e.g., a phase in which the agent 170*a* performs one or more actions to resolve the identified issue). As another example, a customer journey phase label can indicate that a text segment 176 corresponds to a close of conversation phase (e.g., a phase in which the agent 170*a* and customer 170*b* conclude the conversation, such as by speaking parting phrases signifying the end of the conversation). Although example phases are described herein, there are merely illustrative examples. In practice, a system can create customer journey phase labels for text segments 176 in order to indicate other phases, either instead of or in addition to those described herein.

In some implementations, the call analysis engine 150 can combine the customer journey phase-labeled text segments 178 into an aggregated customer journey phase-labeled transcript 180 (e.g., representing the changing contexts over the course of the call 172). Further, based on the customer journey phase-labeled transcript 180, the call analysis engine 150 can track the path of the conversation and the amount of time that was spent on each topic and/or phase of the conversation in order to generate a summary of the customer's "journey" during the call 172. This information can be stored in the form of one or more data structures (e.g., files, database records, data vectors, etc.) along with at least a portion of the label transcript 180. For instance, for an example call, a data structure can indicate that the conversation initially began with 10 seconds of greetings, followed by 30 seconds in which the agent 170*a* confirmed the identity of the customer 170*b*, followed by 2 minutes of the customer 170*b* identifying an issue to the agent 170*a*, followed by 3 minutes of the agent 170*a* providing a solution to the identified issue, and ending with 15 seconds of concluding remarks.

In some implementations, at least some of the data structures can be stored locally (e.g., using one or more hardware data storage devices 160*a* local to the computer system 102*a*). In some implementations, at least some of the data structures can be stored remotely (e.g., using one or more computer systems 102*b* and hardware data storage devices 160*b* remote from the computer system 102*a*, such as remote server computers, cloud computing systems, etc.).

In some implementations, the call analysis engine 150 can system generate information for multiple such calls (e.g., between several respective agents and customers) in order to determine aggregated information regarding the communications between the agents and the customers. In some implementations, at least some of the aggregated information can be stored locally (e.g., as data structures on the hardware data storage devices 160*a*) and/or remotely (e.g., as data structures on the computer systems 102*b* and hardware data storage devices 160*b*).

In some implementations, the call analysis engine 150 can generate and display a graphical user interface 154 to a user of the call analysis engine 150 (e.g., an administrator), such that the user can intuitively understand the nature of the calls, either individually or in aggregate. For example, the call analysis engine 150 can display to the user a graphical user interface 154 that includes at least some of the data generated by the call analysis engine 150 regarding the calls (e.g., the call 172 and/or any other calls), such as in the form of a summary, tables, charts, graphs, etc.

In general, each of the computer systems 102*s* and 102*b* can include any number of electronic devices that are configured to receive, process, and transmit data. Examples of the computer systems include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer systems can include computing devices that operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer systems need not be located locally with respect to the rest of the system 100, and one or more of the computer systems can be located in one or more remote physical locations.

Each the computer systems 102*a* and 102*b* can include a respective user interface (e.g., GUI 154) that enables users interact with the computer system, other computer systems, and/or the call analysis engine 150. Example interactions include viewing data, transmitting data from one computer system to another, and/or issuing commands to a computer system. Commands can include, for example, any user instruction to one or more of the computer systems to perform particular operations or tasks. In some implementations, a user can install a software application onto one or more of the computer systems to facilitate performance of these tasks.

In FIG. 1, the computer system 102*a* is illustrated as a single component. However, in practice, the computer system 102*a* can be implemented on one or more computing devices (e.g., each computing device including at least one processor such as a microprocessor or microcontroller). As an example, the computer system 102*a* can be a single computing device that is connected to the network 106, and the call analysis engine 150 can be maintained and operated on the single computing device. As another example, the computer system 102*a* can include multiple computing devices that are connected to the network 106, and the call analysis engine 150 can be maintained and operated on some or all of the computing devices. For instance, the computer system 102*a* can include several computing devices, and the call analysis engine 150 can be distributed on one or more of these computing devices.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network and can be implemented using one or more networking interfaces.

Figure 2:
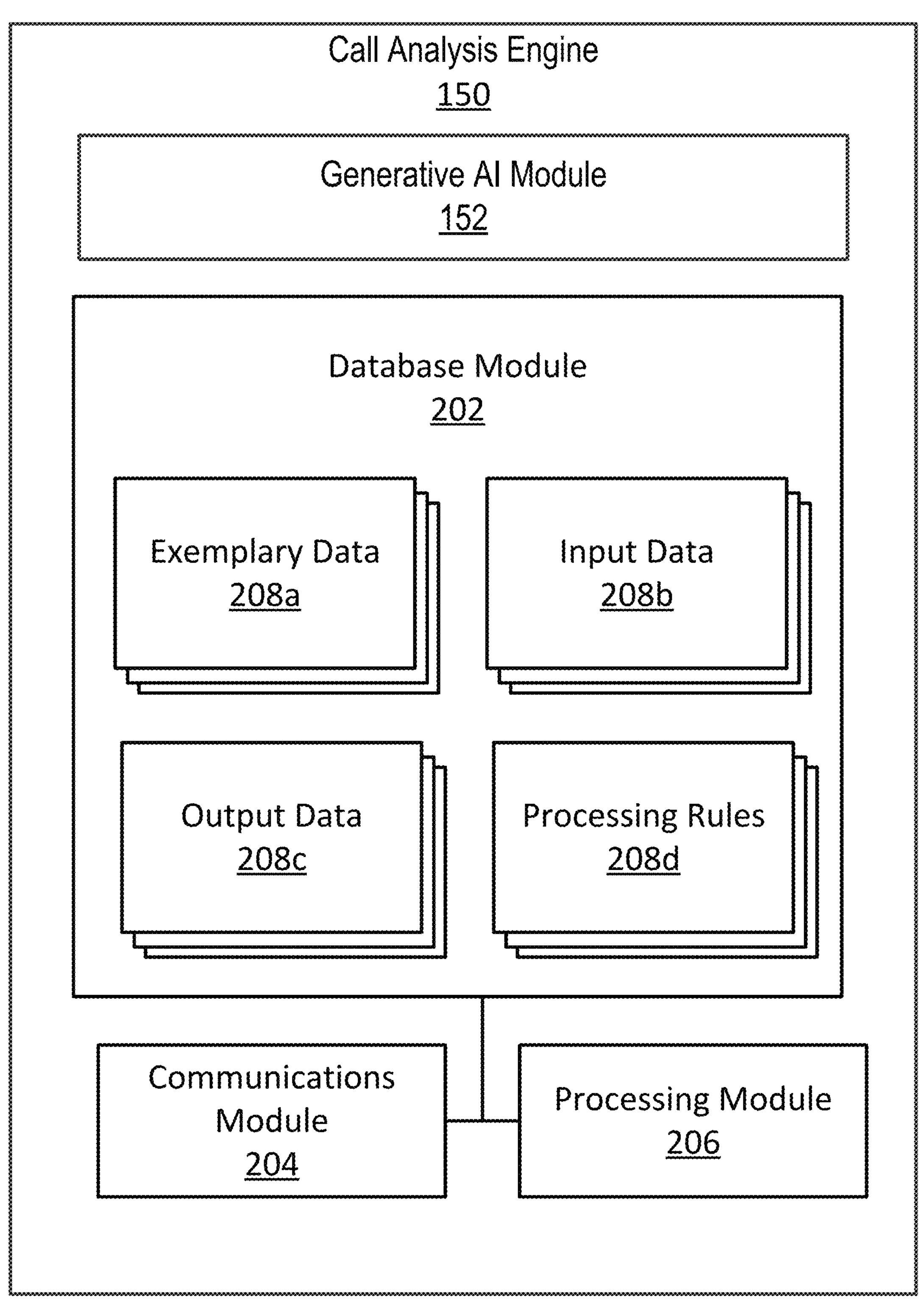
FIG. 2 shows an example call analysis engine.

FIG. 2 shows various aspects of the call analysis engine 150. In general, the call analysis engine 150 includes several operation modules that perform particular functions related to the operation of the call analysis engine 150. For example, the call analysis engine 150 includes a generative AI module 152. Further, the call analysis engine 150 includes a database module 202, a communications module 204, and a processing module 206. The operation modules can be provided as one or more computer executable software modules, hardware modules, or a combination thereof. For example, one or more of the operation modules can be implemented as blocks of software code with instructions that cause one or more processors of the call analysis engine 150 to execute operations described herein. In addition or alternatively, one or more of the operations modules can be implemented in electronic circuitry such as, e.g., programmable logic circuits, field programmable logic arrays (FPGA), or application specific integrated circuits (ASIC).

The database module 202 maintains information related to interpreting calls and generating information regarding those calls using the generative AI module 152.

As an example, the database module 202 can store exemplary data 208*a* for instruction tuning or prompting the generative AI module 152. In some implementations, the exemplary data 208*a* can include text transcriptions of calls (e.g., between one or more agents and customers) that have been manually segmented and labeled (e.g., by a human reviewer) to represent the changing contexts during the course of the call.

As another example, the database module 202 can store input data 208*b* that is used as an input to the generative AI module 152. As an example, the input data 208*b* can include the text transcripts of one or more calls (e.g., the text transcript 174 of the call 172) and/or an audio recording of one or more calls.

As another example, the database module 202 can store output data 208*c* generated by the generative AI module 152. As an example, for each call, the output data 208*c* can include one or more text segments of the call (e.g., the text segments 176), labels for those text segments (e.g., the labeled text segments 178), and/or a complete labeled transcript of the call in its entirety (e.g., the labeled transcript 180).

Further, the database module 202 can store processing rules 208*d* specifying how data in the database module 202 can be processed to interpret calls using the generative AI module 152.

As an example, the processing rules 208*d* can include one or more rules for implementing, instruction tuning or prompting, and operating the generative AI module 152 to produce the output data 208*c*. For example, the one or more rules can specify that the exemplary data 208*a* be provided to the generative AI module 152 for instruction tuning or prompting (e.g., such that the generative AI module 152 can identify trends and/or correlations between the conversation between users during a call and the context of those conversations, and generate output based on those identified trends and/or correlations).

As another example, the one or more rules can specify that the input data 208*b* be provided to the generative AI module 152 (e.g., to generate output data 208*c* representing detailed information regarding those calls).

As another example, the one or more rules can specify that the generated output data 208*d* be presented to the user and/or stored for future retrieval and/or processing (e.g., using the database module 202).

Example data processing techniques are described in further detail below.

As described above, the call analysis engine 150 also includes a communications module 204. The communications module 204 allows for the transmission of data to and from the call analysis engine 150. For example, the communications module 204 can be communicatively connected to the network 106, such that it can transmit data to and receive data from the computer system 102*b*. Information received from the computer system 102*b* can be processed (e.g., using the processing module 206) and stored (e.g., using the database module 202).

As described above, the call analysis engine 150 also includes a processing module 206. The processing module 206 processes data stored or otherwise accessible to the call analysis engine 150. For instance, the processing module 206 can be used to execute one or more of the operations described herein (e.g., operations associated with the generative AI module 152).

In some implementations, a software application can be used to facilitate performance of the tasks described herein. As an example, an application can be installed on the computer systems 102*a*. Further, a user can interact with the application to input data and/or commands to the call analysis engine 150, and review data generated by the call analysis engine 150.

Example Generative AI Modules

In general, the generative AI module 152 is a deep learning model that operates according to the principle of self-attention (e.g., a computer-specific technique that mimics cognitive attention). For example, the generative AI module 152 differentially weighs the significance of each part of an input (which includes the recursive output) data and uses one or more attention mechanism to provide context for any position in the input sequence.

A generalized architecture of a generative AI module is described below.

Input:

In general, input data strings are parsed into tokens (e.g., by a byte pair encoding tokenizer). Further, each token is converted via a word embedding into a vector. In some implementations, positional information of the token can be added to the word embedding.

Encoder/Decoder Architecture:

In general, a generative AI module includes a decoder. Further, in some implementations, the generative AI module can also include an encoder. An encoder includes one or more encoding layers that process the input iteratively one layer after another, while the decoder includes one or more decoding layers that perform a similar operation with respect to the encoder's output.

Each encoder layer is configured to generate encodings that contain information about which parts of the inputs are relevant to each other and passes these encodings to the next encoder layer as inputs. Each decoder layer performs the functional opposite, by taking all the encodings and using their incorporated contextual information to generate an output sequence. To achieve this, each encoder and decoder layer can make use of an attention mechanism.

For each part of the input, an attention mechanism weights the relevance of every other part and draws from them to produce the output. Each decoder layer has an additional attention mechanism that draws information from the outputs of previous decoders, before the decoder layer draws information from the encodings.

Further, the encoder and/or decoder layers can have a feed-forward neural network for additional processing of the outputs and contain residual connections and layer normalization steps.

As an example, one or more attention mechanism can be configured to implement scaled dot-product attention. For instance, when an input data string is passed into the generative AI module, attention weights can be calculated between every token simultaneously. An attention mechanism can produce embeddings for every token in context that contain information about the token itself along with a weighted combination of other relevant tokens each weighted by its attention weight.

For each attention unit, the generative AI module learns three weight matrices: the query weights $W_Q$, the key weights $W_K$, and the value weights $W_V$. For each token i, the input word embedding $x_1$ is multiplied with each of the three weight matrices to produce a query vector $q_i=x_iW_Q$, a key vector $k_i=x_iW_K$, and a value vector $v_i=x_iW_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training, and passed through a softmax which normalizes the weights. The fact that $W_Q$ and $W_K$ are different matrices allows attention to be non-symmetric: if token j (e.g., $q_i \cdot k_j$ is large), this does not necessarily mean that token j will attend to token i (e.g., $q_i \cdot k_j$ could be small). The output of the attention unit for token i is the weighted sum of the value vectors of all tokens, weighted by $a_{ij}$, the attention from token i to each token.

The attention calculation for all tokens can be expressed as one large matrix calculation using the softmax function, which is useful for training due to computational matrix operation optimizations that quickly compute matrix operations. The matrices Q, K, and V are defined as the matrices where the ith rows are vectors $q_i$, $k_i$, and $v_i$, respectively. Accordingly, attention can be presented as:

$$\text{Attention}(Q, K, V) = \text{softmax}\left(\frac{QK^T}{\sqrt{d_k}}\right)V$$

where softmax is taken over the horizontal axis.

In general, one set of ($W_Q$, $W_K$, $W_V$) matrices may be referred to as an attention head, and each layer in a generative AI module can have multiple attention heads. While each attention head attends to the tokens that are relevant to each token, with multiple attention heads the model can do this for different definitions of "relevance."

In addition, the influence field representing relevance can become progressively dilated in successive layers. Further, the computations for each attention head can be performed in parallel, which allows for fast processing. The outputs for the attention layer are concatenated to pass into the feed-forward neural network layers.

Encoder:

In general, encoder can include two major components: a self-attention mechanism and a feed-forward neural network. The self-attention mechanism accepts input encodings from the previous encoder and weights their relevance to each other to generate output encodings. The feed-forward neural network further processes each output encoding individually. These output encodings are then passed to the next encoder as its input, as well as to the decoders.

The first encoder takes positional information and embeddings of the input sequence as its input, rather than encodings.

The encoder is bidirectional. Attention can be placed on tokens before and after the current token.

A positional encoding is a fixed-size vector representation that encapsulates the relative positions of tokens within a target sequence.

The positional encoding is defined as a function of type f: $\mathbb{R} \rightarrow \mathbb{R}^d$; $d \in \mathbb{Z}$, d>0, where d is a positive even integer. The full position encoding can be represented as follows:

$$(f(t)_{2k}, f(t)_{2k}+1) = (\sin(\theta), \cos(\theta)) \;\; \forall\, k \in \{0, 1, \ldots, d/2-1\}$$

$$\text{where } \theta = \frac{c}{r_k},\ r = N^{2/d}.$$

Here, N is a free parameter that is significantly larger than the biggest k that would be input into the positional encoding function.

This positional encoding function allows the generative transformation model to perform shifts as linear transformations:

$$f(t+\Delta t) = \text{diag}(f\Delta t))f(t)$$

where $\Delta t \in \mathbb{R}$ is the distance one wishes to shift. This allows the transformer to take any encoded position and find the encoding of the position n-steps-ahead or n-steps-behind, by a matrix multiplication.

By taking a linear sum, any convolution can also be implemented as linear transformations:

$$\sum_j c_j f(t+\Delta t_j) = \left(\sum_j c_j \mathrm{diag}(f(\Delta t_j))\right) f(t)$$

for any constants $c_j$. This allows the transformer to take any encoded position and find a linear sum of the encoded locations of its neighbors. This sum of encoded positions, when fed into the attention mechanism, would create attention weights on its neighbors, much like what happens in a convolutional neural network language model.

Although an example positional encoding technique is described above, in practice, other positional encoding techniques can also be performed, either instead or in addition to those described above. Further, in some implementations, the generative AI module need not perform positional encoding.

Decoder:

Each decoder includes three major components: a self-attention mechanism, an attention mechanism over the encodings, and a feed-forward neural network. The decoder functions in a similar fashion to the encoder, but an additional attention mechanism is inserted which instead draws relevant information from the encodings generated by the encoders. This mechanism can also be called the encoder-decoder attention.

Like the first encoder, the first decoder takes positional information and embeddings of the output sequence as its input, rather than encodings. The transformer does not use the current or future output to predict an output, so the output sequence is partially masked to prevent this reverse information flow. This allows for autoregressive text generation. For all attention heads, attention cannot be placed on following tokens. The last decoder is followed by a final linear transformation and softmax layer, to produce the output probabilities.

Additional information regarding generative AI modules can be found in "Attention Is All You Need," arXiv: 1706.03762 by Vaswani, et al., the contents of which are incorporated herein in their entirely.

Figure 3:
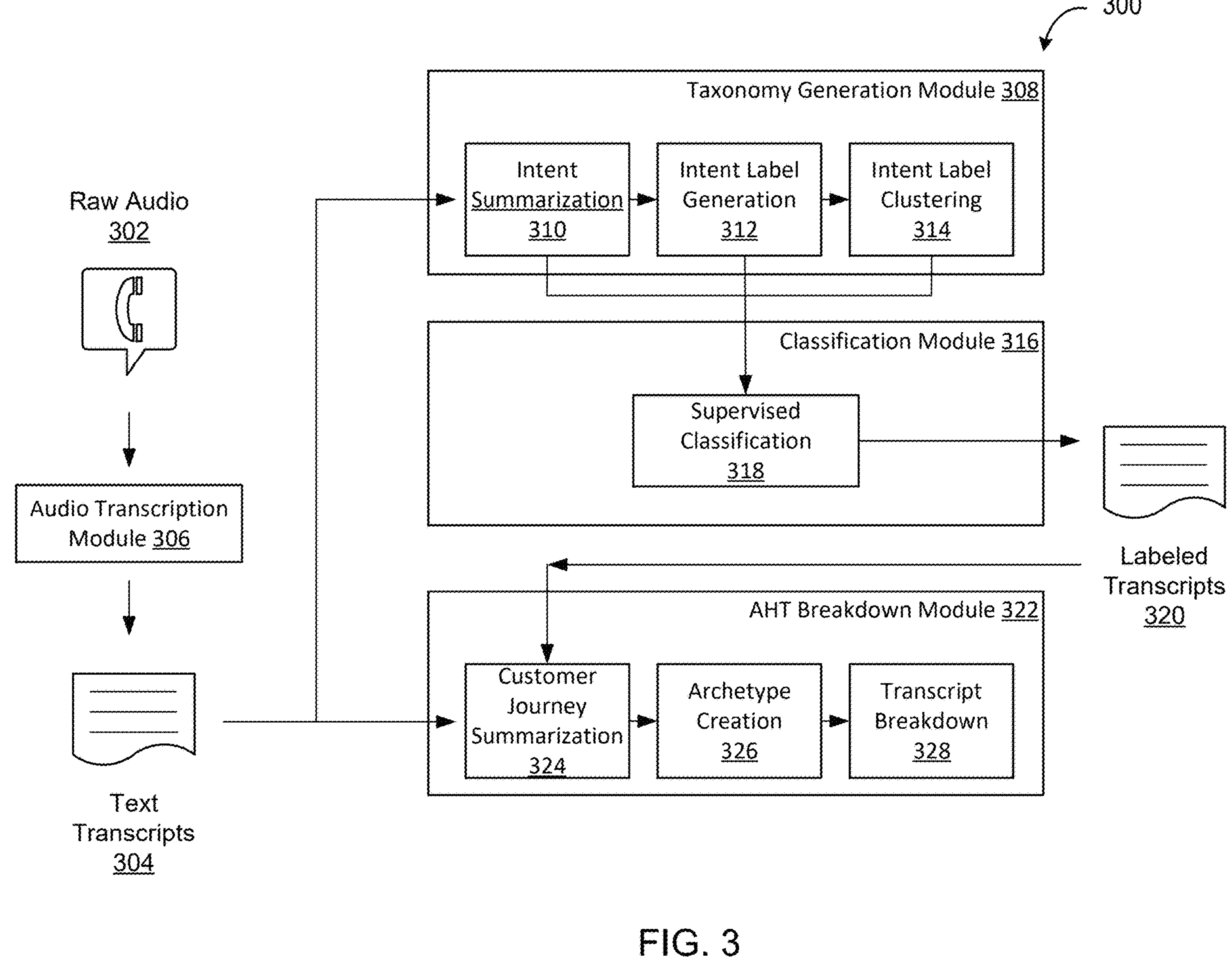
FIG. 3 shows an example process for interpreting and summarizing calls using a generative artificial intelligence (AI) module.

An example process 300 for interpreting and summarizing calls using the generative AI module 152 is shown in FIG. 3.

According to the process 300, a system (e.g., the computer system 102*a* and the call analysis engine 150) retrieves raw audio 302 of a set of calls (e.g., audio recordings of the speech and utterances by the participants of the calls).

Further, the system generates text transcripts 304 of the raw audio 302 (e.g., using an audio transcription module 306). As an example, the audio transcription module 306 can be configured to detect speech or other utterances in the raw audio 302, and generate text (e.g., a sequence of words, phrases, sentences, etc.) representing the speech or utterances. In some implementations, the audio transcription module 306 can transcribe the raw audio 302 automatically (e.g., using transcription software and/or circuitry) and/or based on manual input (e.g., by a human reviewer).

The text transcription 304 is provided to a taxonomy generation module 308 for further processing. In some implementations, the taxonomy generation module 308 automatically identifies sets of intent labels that can be assigned to portions of each of the calls by the generative AI module 152.

The taxonomy generation module 308 performs intent summarization process 310 based on the text transcripts 304. For instance, the intent summarization process 310 can include determining the intent of one or more users during each of the calls (e.g., using the generative AI module 152). As an example, an intent of a customer can include having a particular issue resolved by an agent during the call. As another example, an intent of a customer can include asking for additional information regarding a particular product or service. As another example, an intent of a customer can include purchasing a particular product or service. As another example, an intent of a customer can be obtaining a refund for a previously purchased product or service. As another example, an intent of a customer can be troubleshooting a previously purchased product or service.

In some implementations, the intent summarization process 310 can include providing the text transcripts 304 to the generative AI module 152 and instructing the generative AI module 152 to generate a summary of each of the calls represented by the text transcripts 304.

Further, the taxonomy generation module 308 performs a label generation process 312 based on the determined intent(s). As described above, an intent label can represent a particular topic of discussion during a particular time interval during a call, a phase of the conversation during that time interval, and/or other contextual information regarding the call during that time interval.

In some implementations, the intent label generation process 312 can include providing the previously generated calls summaries to the generative AI module 152 and instructing the generative AI module 152 to generate one or more intent labels based on those call summaries.

Further, the taxonomy generation module 308 performs an intent label clustering process 314 based on the generated intent labels and identifies a subset of the intent labels for use in annotating calls. As an example, the taxonomy generation module 308 can obtain each of the generated intent labels, and cluster similar intent labels together (e.g., labels representing a similar semantic meaning or context). Further, the taxonomy generation module 308 can identify clusters of intent labels that are particularly large (e.g., indicating that those intent labels represent topics or contexts that are frequently exhibited during calls). The taxonomy generation module 308 can select at least some of those intent labels for use in analyzing calls by the generative AI module 152.

This intent label identification process can be beneficial, for example, in allowing the system to organically identify a set of intent labels that can be used to annotate a call (e.g., based on an analysis of text transcript), without requiring that a human reviewer manually provide a list of intent labels. Accordingly, the system can automatically identify different sets of intent labels that are specific to different respective type of calls, without requiring manual human intervention. Further, this intent label identification process allows the system to determine a narrowly tailored set of intent labels for each type of call (e.g., 5-20 categories, in some example implementations), rather than using a large number of intent labels that may be difficult for a user to differentiate between them.

The output of the intent summarization process 310, label generation process 312, and intent label clustering process 314 are provided to a classification module 316 to generate intent-labeled transcripts of the calls. For example, the classification module 316 can perform a classification process 318 based on the output of the taxonomy generation module 308 in order to generate an intent-labeled transcripts 320 of each of the calls. In some implementations, the classification process 318 can be performed for multiple transcripts in a batch (e.g., a batched classification process). In some implementations, the classification process 318 can be performed for each transcript individually.

In some implementations, the intent label generation process 312 can include providing the text transcripts 304 to the generative AI module 152 and instructing the generative AI module to label the text transcripts 304 using the set of intent labels identified by the taxonomy generation module 308 (e.g., the output of the intent label clustering process 314). In some implementations, the generative AI module 152 can segment each of the text transcripts 304 into several text segments and assign one or more intent label to each of the text segments based on the context of the call during that text segment. Further, the generative AI module 152 can aggregate or recombine the intent-labeled text segments to generate a full intent-labeled transcript 320 for each of the calls.

The intent-labeled transcripts 320 are provided to an average handle time (AHT) breakdown module 322 for further processing.

As an example, the AHT breakdown module 322 performs a customer journey summarization process 324 to generate a summary of the progression of each of the calls from beginning to completion.

Figure 4:
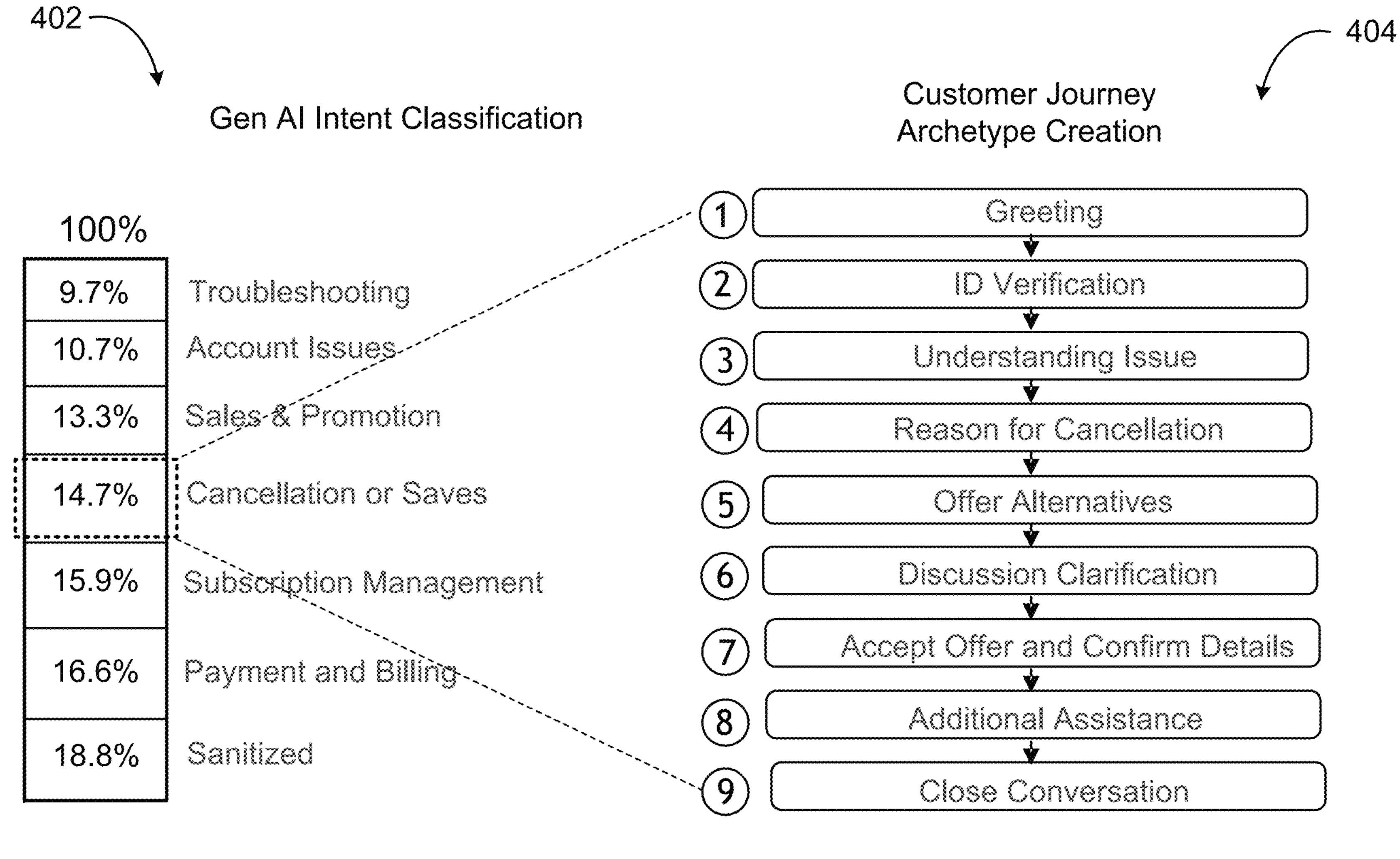
FIG. 4 shows example output of a call analysis engine.
Figure 4:
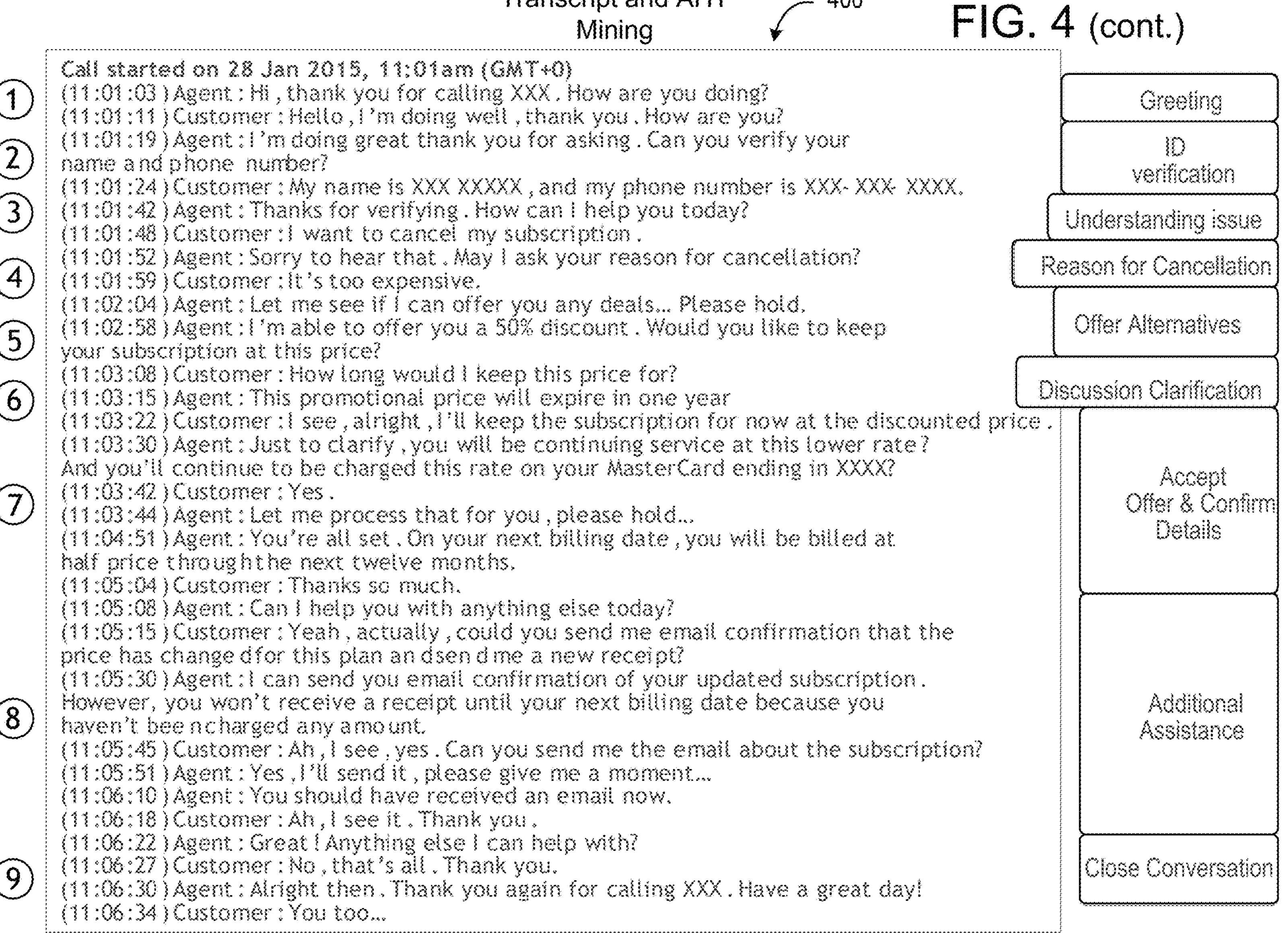

For example, referring to FIG. 4, the classification module 316 can determine that the intent of a customer during a particular call was to cancel a service or subscription (panel 402).

Further, based on the intent-labeled transcript 320 for that call, the AHT breakdown module 322 can determine that the call progressed according to a sequence of specific phases (panel 404). This determination also can be referred to as an archetype creation process 326 (e.g., as shown in FIG. 3).

For instance, in the example shown in FIG. 4, the customer's journey included a greeting phase, a ID verification phase, a phase in which the customer's issue was identified, a phase in which the customer conveyed their reason for wanting to cancel the service or subscription, a phase in which the agent offered alternatives to the customer, a phase in which the customer and agent discussed clarifications regarding the alternatives, a phase in which the customer accepted the offer and the agent confirmed details regarding the offer, a phase in which the agent provided additional assistance to the customer, and a phase in which the customer and agent closed their conversation.

In at least some implementations, the AHT breakdown module 322 can obtain transcripts for multiple calls having a similar intent and determine the customers' journeys through each of those calls using the generative AI module 152. For example, the AHT breakdown module 332 can obtain a first set of transcripts for several calls in which the users attempt to cancel a service or subscription and provide the transcripts to the generative AI module 152 to identify specific phases of the conversations (e.g., phases that may occur during a cancelation "archetype" specifically). Further, the AHT breakdown module 332 can obtain a second set of transcripts for several calls in which the users attempt to begin a service or subscription and provide the transcripts to the generative AI module 152 to identify specific phases of the conversations (e.g., phases that may occur during a subscription sign up "archetype" specifically). The AHT breakdown module 332 can perform similar analyses with respect to each of the other types of calls (e.g., determine phases of conversations differently, based on the users' intent) using the generative AI module 152. Further, the AHT breakdown module 322 performs transcription breakdown process 328. As an example, referring to FIG. 4, the AHT breakdown module 322 can generate and display the customer journey phase-labeled transcript 328, including indications of each text segment and the customer journey phase label(s) assigned to each text segment (e.g., panel 406). This allows a user to intuitively understand the high-level topics that were discussed during call (e.g., by reviewing the labels assigned to the text transcript) and cross-reference those topics to specific portions of the conversation (e.g., by reviewing the underlying text transcripts associated with each of the labels). At least a portion of this information can be presented to a user using a GUI (e.g., a GUI including a first portion indicating the various text segments of a call, and a second portion alongside the first portion the corresponding labels, as shown in panel 406).

Figure 5:
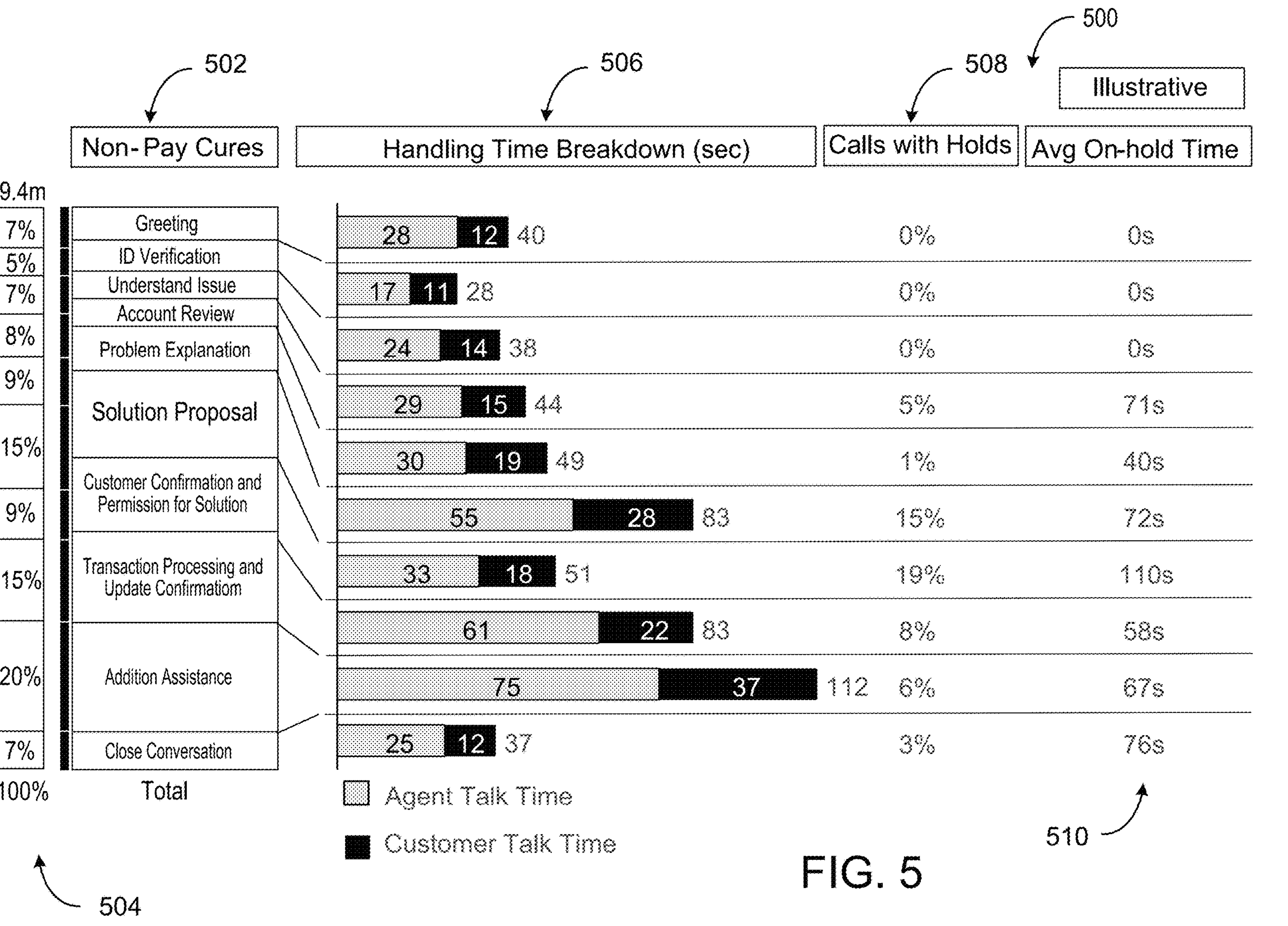
FIGS. 5 and 6A-6F show example graphical user interfaces.

Further, the call analysis engine 150 can provide additional information regarding call. As an example, referring to FIG. 5, the call analysis engine 150 can generate a GUI 500 that indicates each of the customer journey phase labels identified during a particular call (panel 502), and the percentage of the call's duration that is associated with each of the customer journey phase labels (panel 504). Further, the GUI 500 indicates the length of time associated with each of the labels, including the length of time in which the customer was speaking and the length of time that the agent was speaking (panel 506). Further, the GUI 500 indicates whether particular customer journey phase labels are associated with the customer being placed on hold by the agent (panel 508) and the average amounted of time that the customer was placed on hold (panel 510). This GUI can be helpful, for example, in allowing a user (e.g., an agent or administrator) to intuitively understand how an agent interacted with a customer during a particular call, without manually reviewing the call's transcript.

In some implementations, the call analysis engine 150 can determine information regarding several calls (e.g., several calls between respective agents and customers) in order to determine aggregated information regarding the communications between the agents and the customers. Further still, the system can generate and display a graphical user interface to a user, such that the user can intuitively understand the nature of the calls, either individually or in aggregate.

Figure 6A:
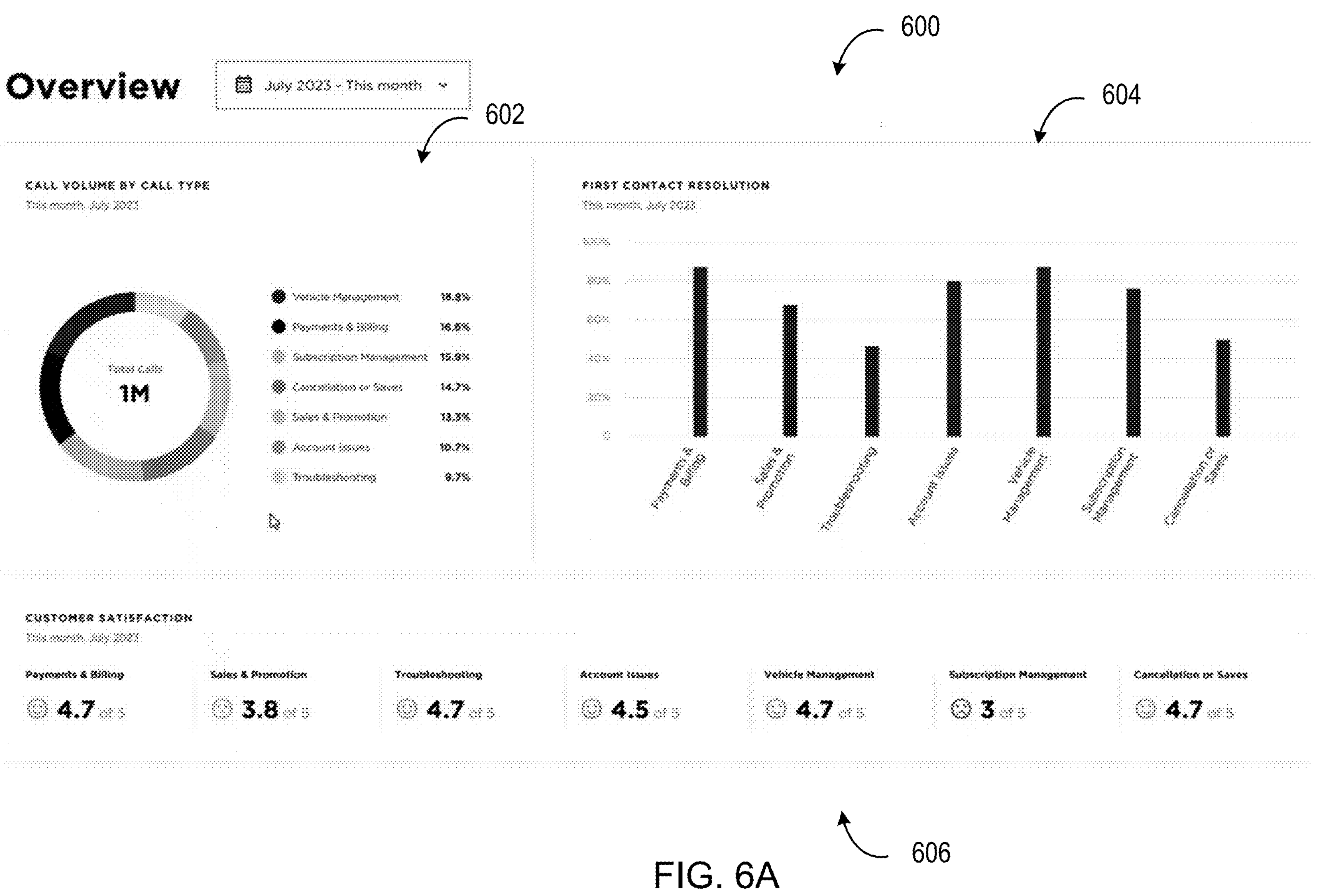

As an example, FIG. 6A shows a GUI 600 for displaying summary information regarding multiple calls. The GUI 600 indicates the total number of calls, and the distribution of calls between different types (panel 602). Further, the GUI 600 indicates the types of calls in which the customers' issues were resolved in the first contact (panel 604). Further, the GUI 600 indicates the customers' satisfaction with respect to each of the types of calls (panel 606), such as based on post-call customer surveys.

Figure 6B:
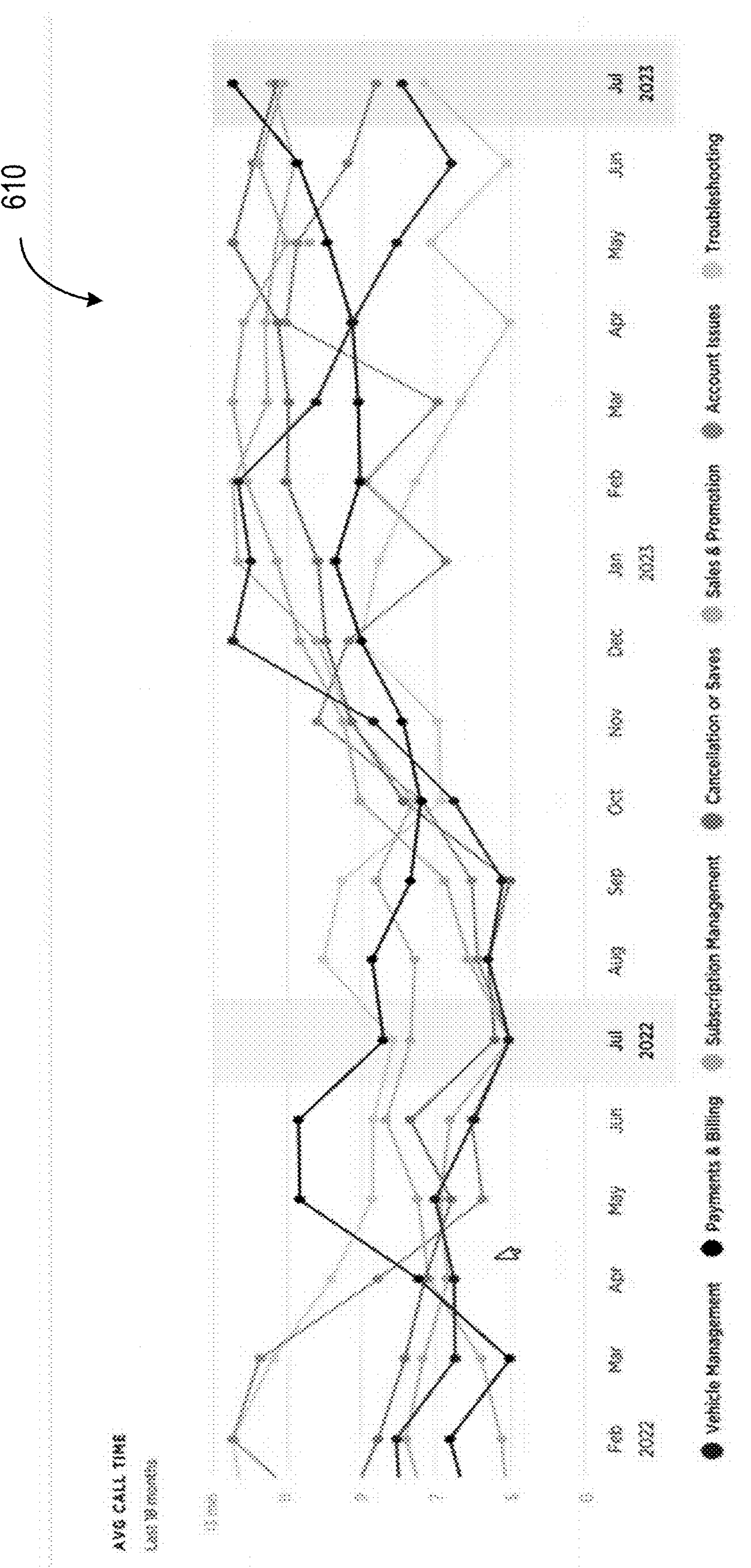

As another example, FIG. 6B shows a GUI 610 that indicates the average call time for each of several types of calls over a period of time.

Figure 6C:
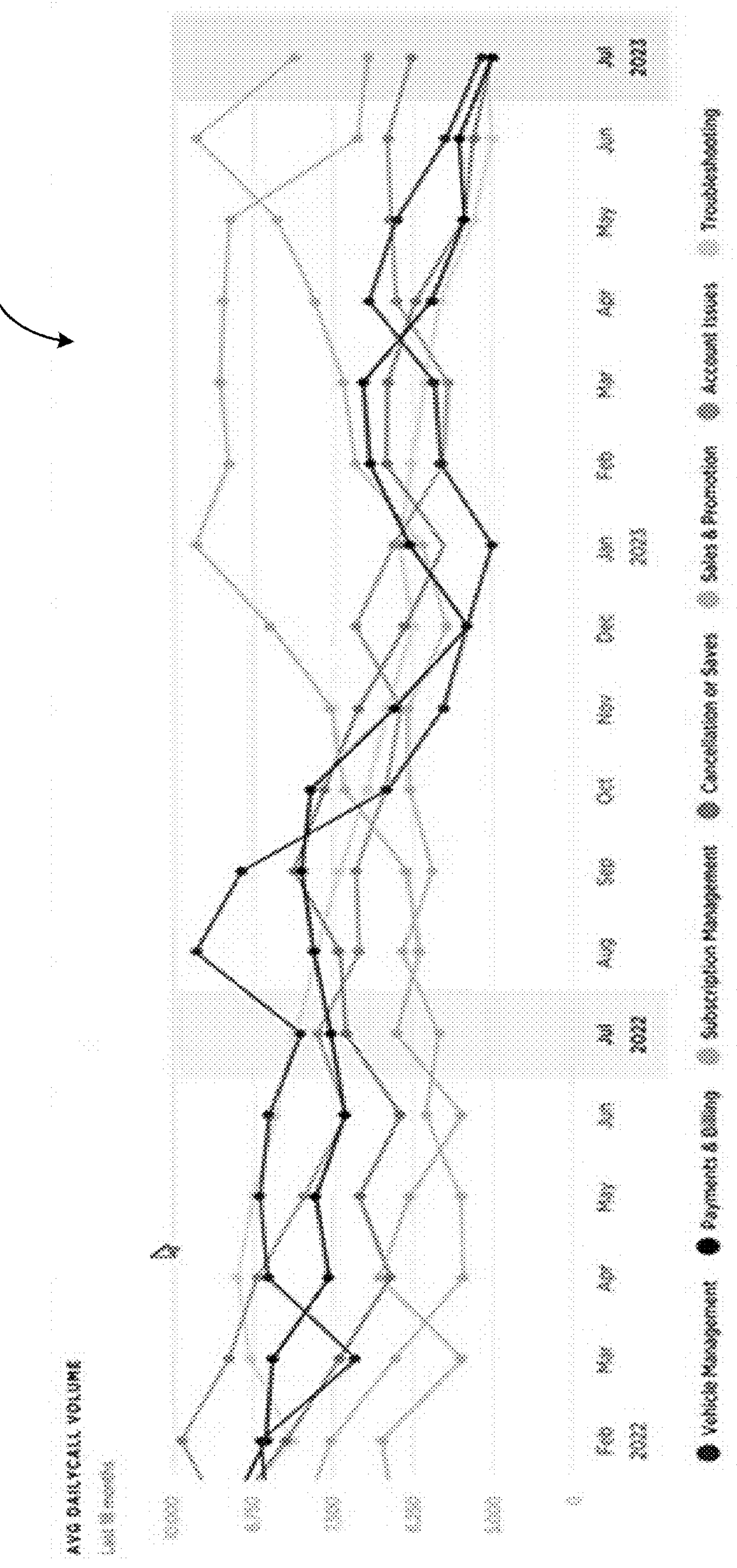

As another example, FIG. 6C shows a GUI 620 that indicates the average daily call volume for each of several types of calls over a period of time.

Figure 6D:
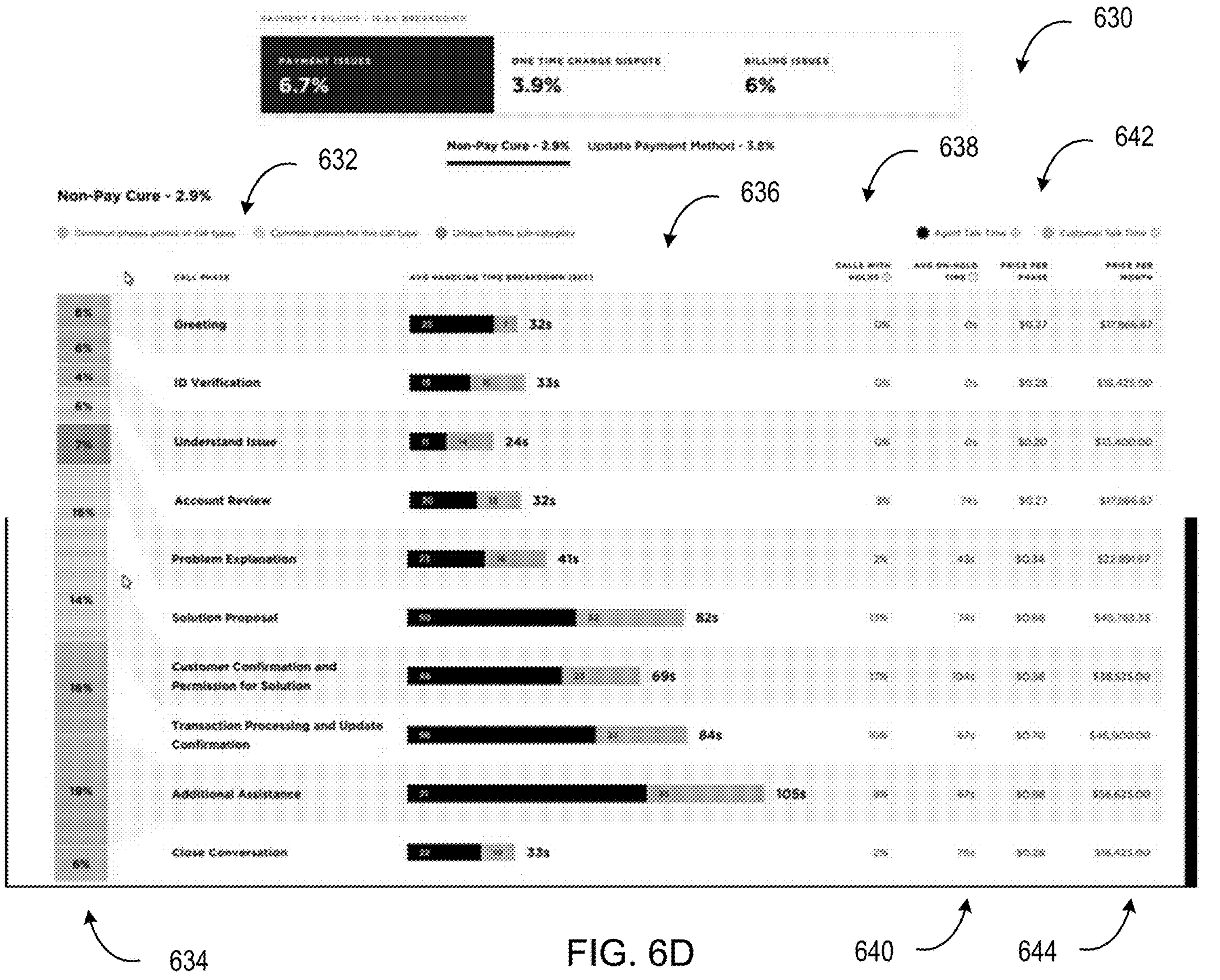

As another example, FIG. 6D shows a GUI 630 that indicates each of the customer journey phase labels identified during a particular call (panel 632), and the percentage of the call's duration that is associated with each of the customer journey phase labels (panel 634). Further, the GUI 630 indicates the length of time associated with each of the customer journey phase labels, including the length of time in which the customer was speaking and the length of time that the agent was speaking (panel 636). Further, the GUI 630 indicates whether particular customer journey phase labels are associated with the customer being placed on hold by the agent (panel 638) and the average amounted of time that the customer was placed on hold (panel 640). Further, the GUI 620 indicates a cost associated with each customer journey phase label (e.g., the cost of human labor, infrastructure costs, etc.) for each call (panel 642), and the cost associated with each customer journey phase label across all calls during a particular period of time (e.g., monthly) (panel 644).

Figure 6E:
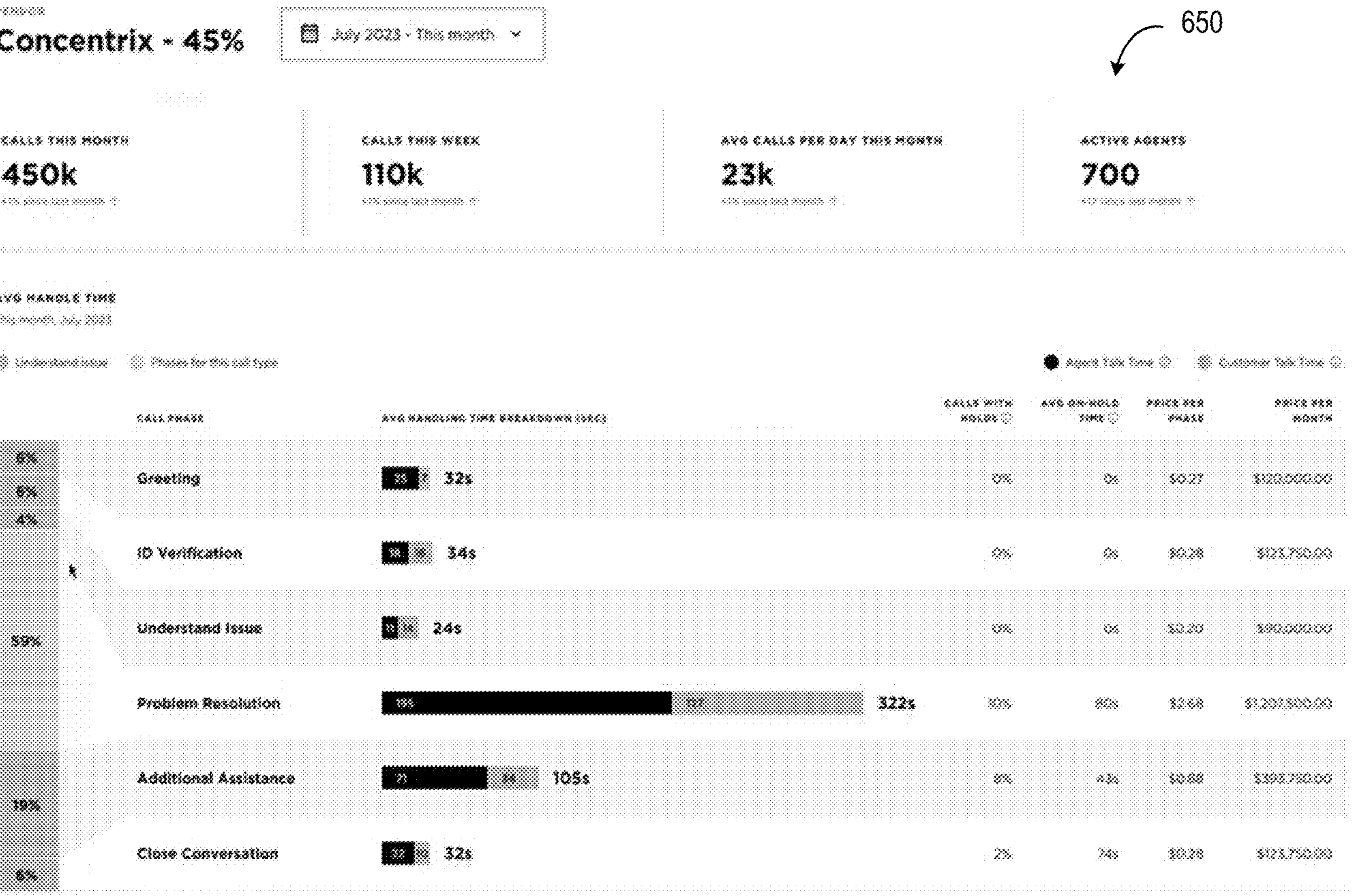

In some implementations, information can be filtered according to the specific entities that provides call center services to a company. For example, a company may employ the services of several vendors to handle customer inquiries via telephone. Referring to FIG. 6E, a GUI 650 can present information specific to a particular entity (e.g., in this example, "Concentrix"). This can be beneficial, for example, in allowing a user to intuitively compare the performance of multiple entities in handling calls from customers.

Figure 6F:
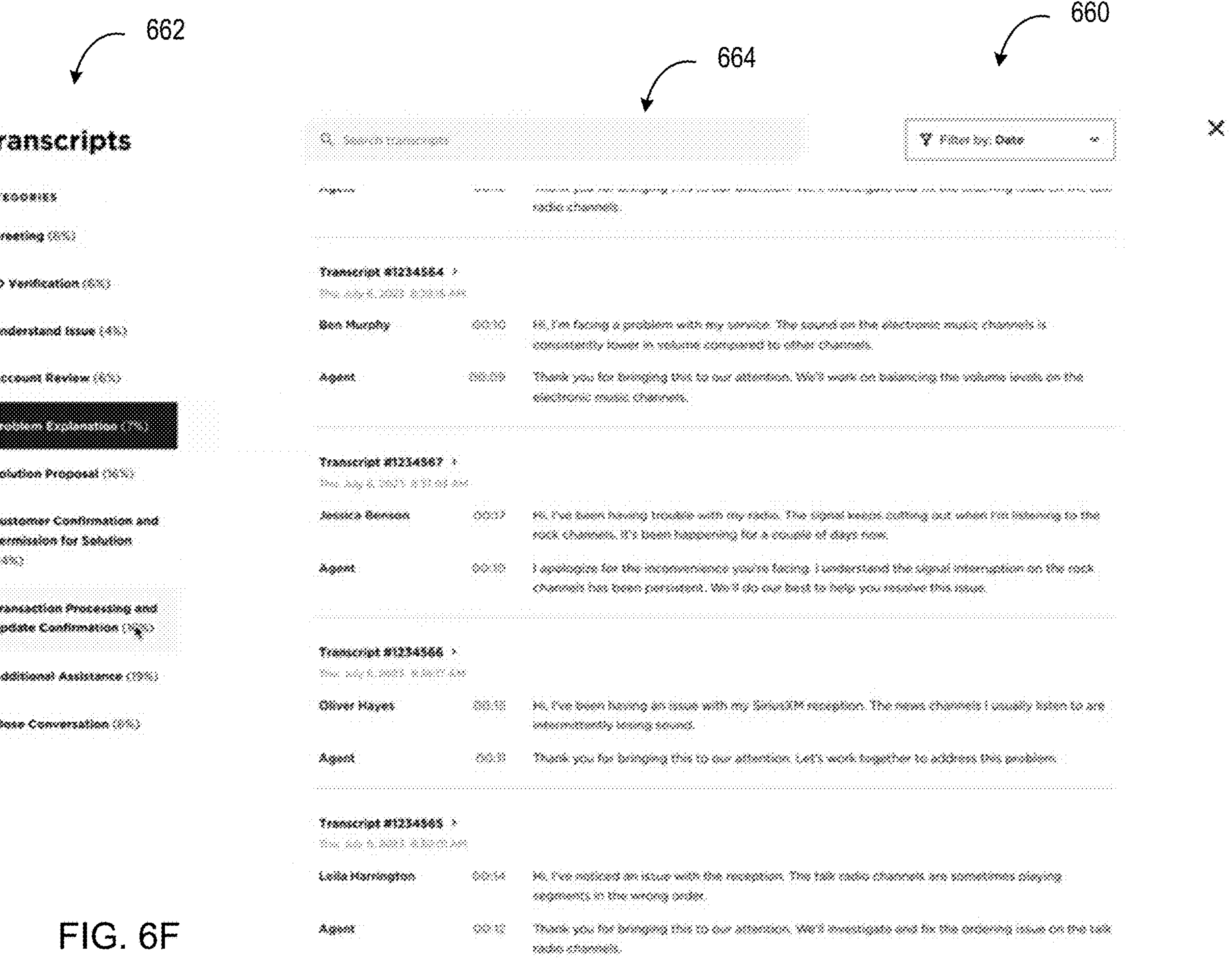

As another example, FIG. 6F shows a GUI 660 that allows a user to browse and review call transcripts. For example, the GUI 660 indicates several different customer journey phase labels that can be assigned to a call (panel 662). Upon a user selecting one of the labels, the GUI 660 displays text segments from calls that have been assigned that customer journey phase label. This can be useful, for example, in allowing a user to compare how different agents and/or customers interact with one another during a call in a particular context.

Example Processes

Figure 7:
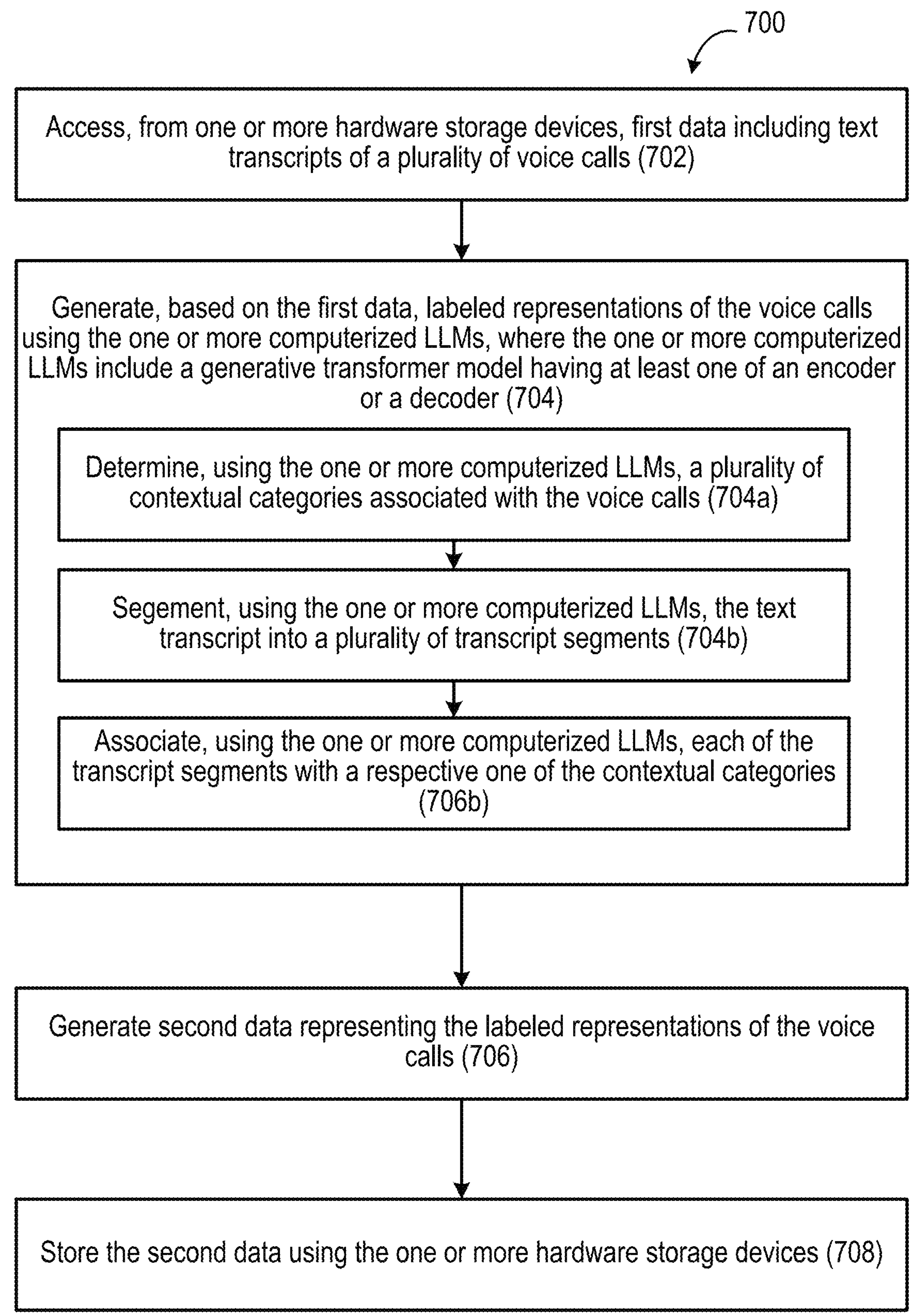
FIG. 7 illustrates an example process for interpreting calls between users and generating detailed information regarding those calls using a generative AI system.

FIG. 7 shows an example process 700 for interpreting calls between users (e.g., an agent and a customer) and generating detailed information regarding those calls using a generative AI system. In some implementations, the process 700 can be performed by the system 100 described in this disclosure (for example, the system 100 including the call analysis engine 150 shown and described with reference to FIGS. 1 and 2) using one or more processors (for example, using the processor or processors 810 shown in FIG. 8).

In the process 700, a system accesses, from one or more hardware storage devices, first data including text transcripts of a plurality of voice calls (702).

The system generates, based on the first data, labeled representations of the voice calls using one or more computerized LLMs (704). The one or more computerized LLMs include a generative transformer model having at least one of an encoder or a decoder.

In some implementations, the voice calls can be conducted between one or more customers of an organization and one or more representations of the organization.

Generating the labeled representations of the voice calls includes several operations, examples of which are described below.

The system determines, using the one or more computerized LLMs, a plurality of contextual categories associated with the voice calls (704*a*).

The system segments, using the one or more computerized LLMs, the text transcript into a plurality of transcript segments (704*b*).

The system associates, using the one or more computerized LLMs, each of the transcript segments with a respective one of the contextual categories (704*c*).

In some implementations, the contextual categories can include at least one of: a greeting category, a caller identification category, or a conversation close category.

In some implementations, the contextual categories can include one or more categories associated with providing customer service by a first user to a second user.

In some implementations, the system can determine the contextual categories, at least in part, by causing the one or more computerized LLMs to generate summaries of each of the text transcripts and causing the one or more computerized LLMs to determine a plurality of candidate contextual categories based on the summaries.

In some implementations, the system can determine the contextual categories, at least part, by clustering the candidate contextual categories into a plurality of clusters, and selecting the contextual categories based on the clusters.

In some implementations, the contextual categories can be determined using a machine learning process.

In some implementations, each of the transcript segments can be associated with a respective one of the contextual categories using a machine learning process.

Further, the system generates second data representing the labeled representations of the voice calls (706).

In some implementations, the second data can include one or more data structures representing an association between each of the transcript segments and the respective one of the contextual categories.

The system also stores the second data using the one or more hardware storage devices (708). In some implementations, the one or more hardware storage devices can be implemented on the computer system. In some implementations, the one or more hardware storage devices can be implemented on one or more additional computer systems remote from the computer system.

In some implementations, the system can also generate a graphical user interface. The graphical user interface can include at least a portion of the second data. Further, the system can cause the graphical user interface to be presented to a user.

In some implementations, the graphical user interface can include (i) a first graphical element including at least a portion of the text transcripts, and (ii) one or more graphical labels overlaid on the first graphical element, where each of the graphical labels represents a respective one of the contextual categories.

In some implementations, the method can further include determining, for each of the contextual categories, an aggregate call time of the voice calls associated with that contextual category.

In some implementations, the system can also generate a graphical user interface representing the aggregate call times of each of the contextual categories, and causing, the graphical user interface to be presented to a user.

In some implementations, the system can also receive one or more audio recordings of the voice calls, and generate, using a computerized speech recognition system, at least some of the text transcriptions based on the one or more audio recordings.

In some implementations, at least one of the encoder or the decoder can be configured to apply a computerized attention mechanism over its respective inputs while generating the labeled representations of the voice calls.

In some implementations, the system can generate graphs representing a customer journey associated with each of the voice calls and include at least some of the graphs in the second data.

In some implementations, generating the graphs can include, for each of the voice calls: (i) determining, based on the second data, a plurality of states of the voice call; (ii) determining, based on the first data, an order of the plurality of states; (iii) generating a data structure representing the plurality of state of the voice call and an order of the plurality of states; and (iv) generating the graphs based on the data structure.

In some implementations, the system can also perform, for each of the voice calls: (i) determining a call type of the voice call, and (ii) generating the labeled representation of the voice call based on the determined call type.

In some implementations, the contextual categories can be determined based on the call type.

Example Computer Systems

Figure 8:
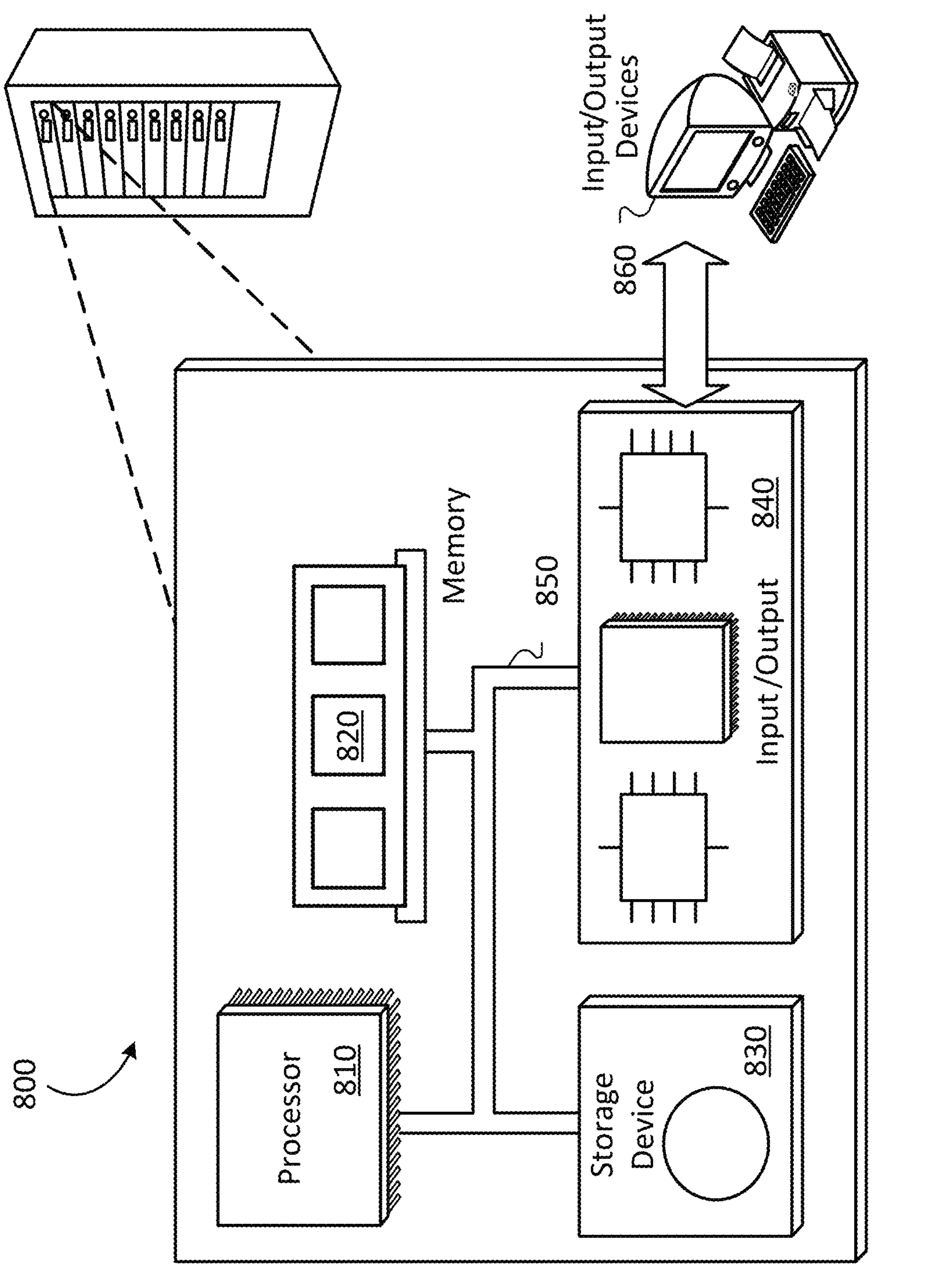
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. The system 800 may include one or more processors 810, a memory 820, one or more storage devices 830, and one or more input/output (I/O) devices 880 controllable through one or more I/O interfaces 840. The various components 810, 820, 830, 840, or 860 may be interconnected through at least one system bus 850, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 860. The I/O device(s) 860 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 860 may also include one or more output devices such as a display, LED(s), an audio output device (e.g., a speaker), a printer, a haptic output device, and so forth. The I/O device(s) 860 may be physically incorporated in one or more computing devices of the system 800 or may be external with respect to one or more computing devices of the system 800.

The system 800 may include one or more I/O interfaces 840 to enable components or modules of the system 800 to control, interface with, or otherwise communicate with the I/O device(s) 860. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially be claimed as such, one or more features from a claimed combination can in some cases be excised from the combination, and the claimed combination may be directed to a sub combination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for segmenting and labeling text transcriptions using one or more computerized large language models (LLMs), the method comprising:

accessing, by a computer system from one or more hardware storage devices, first data comprising text transcripts of a plurality of voice calls;

generating, using the one or more computerized LLMs by the computer system based on the first data, labeled representations of the voice calls, wherein the one or more computerized LLMs comprise a generative transformer model having at least one of an encoder or a decoder, wherein generating the labeled representations of the voice calls comprises:

determining, using the one or more computerized LLMs, a plurality of contextual categories associated with the voice calls, segmenting, using the one or more computerized LLMs, the text transcript into a plurality of transcript segments, labeling, using the one or more computerized LLMs, each of the transcript segments in accordance with a respective one of the contextual categories, and based on the labeled transcript segments, generating, using the one or more computerized LLMs, the labeled representations of the voice calls, and storing, by the computer system, the labeled representations of the voice calls using the one or more hardware storage devices.

2. The method of claim 1, further comprising generating second data representing the labeled representations of the voice calls, wherein the second data comprises one or more data structures representing an association between each of the transcript segments and the respective one of the contextual categories.

3. The method of claim 2, further comprising:

generating, by the computer system, a graphical user interface, wherein the graphical user interface includes at least a portion of the second data; and causing, by the computer system, the graphical user interface to be presented to a user.

4. The method of claim 3, wherein the graphical user interface comprises:

a first graphical element comprising at least a portion of the text transcripts; and one or more graphical labels overlaid on the first graphical element, wherein each of the graphical labels represents a respective one of the contextual categories.

5. The method of claim 1, further comprising:

determining, for each of the contextual categories, an aggregate call time of the voice calls associated with that contextual category.

6. The method of claim 5, further comprising:

generating, by the computer system, a graphical user interface representing the aggregate call times of each of the contextual categories, and causing, by the computer system, the graphical user interface to be presented to a user.

7. The method of claim 1, further comprising:

receiving one or more audio recordings of the voice calls, and generating, using a computerized speech recognition system, at least some of the text transcriptions based on the one or more audio recordings.

8. The method of claim 1, wherein the contextual categories comprise at least one of:

a greeting category, a caller identification category, or a conversation close category.

9. The method of claim 1, wherein the contextual categories comprise one or more categories associated with providing customer service by a first user to a second user.

10. The method of claim 1, wherein determining the contextual categories comprises:

causing the one or more computerized LLMs to generate summaries of each of the text transcripts, and causing the one or more computerized LLMs to determine a plurality of candidate contextual categories based on the summaries.

11. The method of claim 10, wherein determining the contextual categories comprises:

clustering the candidate contextual categories into a plurality of clusters, and selecting the contextual categories based on the clusters.

12. The method of claim 1, wherein the contextual categories are determined using a machine learning process.

13. The method of claim 1, each of the transcript segments is associated with a respective one of the contextual categories using a machine learning process.

14. The method of claim 1, wherein at least one of the encoder or the decoder is configured to apply a computerized attention mechanism over its respective inputs while generating the labeled representations of the voice calls.

15. The method of claim 1, wherein the voice calls are conducted between one or more customers of an organization and one or more representations of the organization.

16. The method of claim 1, further comprising:

generating graphs representing a customer journey associated with each of the voice calls.

17. The method of claim 16, wherein generating the graphs comprises, for each of the voice calls:

determining, a plurality of states of the voice call;

determining, based on the first data, an order of the plurality of states;

generating a data structure representing the plurality of state of the voice call and an order of the plurality of states; and generating the graphs based on the data structure.

18. The method of claim 1, further comprising:

for each of the voice calls:

determining a call type of the voice call; and generating the labeled representation of the voice call based on the determined call type.

19. The method of claim 18, wherein the contextual categories are determined based on the call type.

20. The method of claim 1, wherein the one or more hardware storage devices are implemented on the computer system.

21. The method of claim 1, wherein the one or more hardware storage devices are implemented on one or more additional computer systems remote from the computer system.

22. A system, comprising:

at least one processor; and a memory communicatively coupled to the at least one processor, the memory storing instructions which, when executed by the at least one processor, cause the at least one processor to perform operations comprising:

accessing, from one or more hardware storage devices, first data comprising text transcripts of a plurality of voice calls;

generating, using one or more computerized large language models (LLMs) based on the first data, labeled representations of the voice calls, wherein the one or more computerized LLMs comprise a generative transformer model having at least one of an encoder or a decoder, wherein generating the labeled representations of the voice calls comprises:

determining, using the one or more computerized LLMs, a plurality of contextual categories associated with the voice calls, segmenting, using the one or more computerized LLMs, the text transcript into a plurality of transcript segments, labeling, using the one or more computerized LLMs, each of the transcript segments in accordance with a respective one of the contextual categories, and based on the labeled transcript segments, generating, using the one or more computerized LLMs, the labeled representations of the voice calls, and storing the labeled representations of the voice calls using one or more hardware storage devices.

23. One or more non-transitory computer-readable media storing instructions which, when executed by at least one processor, cause the at least one processor to perform operations comprising:

accessing, from one or more hardware storage devices, first data comprising text transcripts of a plurality of voice calls;

generating, using one or more computerized large language models (LLMs) based on the first data, labeled representations of the voice calls, wherein the one or more computerized LLMs comprise a generative transformer model having at least one of an encoder or a decoder, wherein generating the labeled representations of the voice calls comprises:

determining, using the one or more computerized LLMs, a plurality of contextual categories associated with the voice calls, segmenting, using the one or more computerized LLMs, the text transcript into a plurality of transcript segments, labeling, using the one or more computerized LLMs, each of the transcript segments in accordance with a respective one of the contextual categories, and based on the labeled transcript segments, generating, using the one or more computerized LLMs, the labeled representations of the voice calls, and storing the labeled representations of the voice calls using one or more hardware storage devices.

* * * * *